United States Patent [19]
Rydval

[11] Patent Number: 5,892,300
[45] Date of Patent: Apr. 6, 1999

[54] SYSTEM FOR CONTACTLESS POWER AND DATA TRANSMISSION

[75] Inventor: Peter Rydval, München, Germany

[73] Assignee: Siemens Aktiengesellschaft, Munich, Germany

[21] Appl. No.: 848,017

[22] Filed: Apr. 28, 1997

Related U.S. Application Data

[63] Continuation-in-part of PCT/DE95/01493, Oct. 26, 1995 published as WO96/13804, May 9, 1996.

[30]     Foreign Application Priority Data

Oct. 26, 1994 [DE] Germany ............................ 44 38 286.3

[51] Int. Cl.⁶ ..................................................... H01F 27/42
[52] U.S. Cl. ....................................... 307/104; 340/310.07
[58] Field of Search ....................... 307/104; 340/310.01, 340/310.07; 439/950; 336/DIG. 2; 455/41; 342/51; 331/167, 177 V

[56]             References Cited

U.S. PATENT DOCUMENTS 4,011,585  3/1977  Sunaga .
4,196,418  4/1980  Kip et al. .
5,450,088  9/1995  Kaiser .

FOREIGN PATENT DOCUMENTS

| 0 266 125 A1 | 5/1988 | European Pat. Off. . |
| 0 297 688 A1 | 1/1989 | European Pat. Off. . |
| 0372 430 A2 | 6/1990 | European Pat. Off. . |
| 0 407 848 A2 | 1/1991 | European Pat. Off. . |
| 0 615 136 A2 | 9/1994 | European Pat. Off. . |
| 38 10 702 C2 | 10/1989 | Germany . |
| 39 22977 C2 | 4/1992 | Germany . |
| 93/23908 | 11/1993 | WIPO . |

*Primary Examiner*—Richard T. Elms
*Attorney, Agent, or Firm*—Herbert L. Lerner; Laurence A. Greenberg

[57]             ABSTRACT

A system for contactless power and data transmission contains a stationary station and a mobile station. In order to tune a resonant circuit of the mobile station to the resonant frequency of the stationary station, a multiplicity of capacitors which can be connected in parallel with the resonant circuit are provided. An instantaneous operating state of the system is included in the tuning. The realization is easy to integrate.

3 Claims, 2 Drawing Sheets

CONTROL DEVICE

SYSTEM FOR CONTACTLESS POWER AND DATA TRANSMISSION

CROSS-REFERENCE TO RELATED APPLICATION

This application is a continuation of application No. PCT/DE95/01493, filed Oct. 26, 1995, published as WO96/13804 May 9, 1996.

BACKGROUND OF THE INVENTION

FIELD OF THE INVENTION

The invention relates to a system for contactless power and data transmission.

Such systems include a stationary station and a mobile part, for example in the form of a smart card or a chip key, etc. The stationary station supplies power which is necessary for operation of the mobile part. A loosely coupled coil pair, in which each coil is assigned to a resonant circuit in the mobile part and the stationary part, is generally provided for that purpose. A radio-frequency signal is used for the power transmission. In the mobile part, that signal is fed to a rectifier unit and, if appropriate, to a voltage regulating unit which is connected downstream of the rectifier unit. The DC voltage obtained therefrom is used to supply the mobile part with power. Such systems are employed, for example, in recognition systems, immobilizers, smart cards and recognition systems for identifying useful animals, etc.

In the case of such systems with contactless power transmission, the transmission efficiency is highest when the transmission frequency of the primary circuit corresponds to the resonant frequency of the secondary circuit. The primary circuit contains, for example, the resonant circuit of the stationary part, and the secondary circuit that of the mobile part. Due to parameter fluctuations of the components and interference influences coupled in externally, that requirement can only be achieved within the sum of component parameters and other influencing quantities. Tuning of the secondary circuit is necessary in order to achieve the best possible signal and power transmission.

German Patent DE 38 10 702 C2 specifies a device for contactless signal and power transmission in which the stationary station contains a tunable resonant circuit that is driven by a control circuit in order to carry out tuning to the receiving circuit of the mobile part, thereby achieving the best possible reception. The stationary station contains a further resonant circuit. The signals which can be picked off from the resonant circuits are evaluated with regard to the relative phase angle with respect to one another. Series-connected variable-capacitance diodes which, for their part, are connected in parallel with the resonant circuit of the mobile station that is to be tuned, are controlled in dependence on that evaluation.

Published International Patent Application WO 93/23908 describes a system for contactless power and data transmission between a primary station and at least one mobile secondary station, in which system the secondary resonant circuit in the mobile station is tuned to the primary resonant circuit in such a way that capacitors can be connected in parallel. In order to set the tuning, it is proposed to derive a voltage signal from the reception frequency. The voltage signal is compared with a reference signal. A switching signal for the optional switching-in of the capacitors is derived from the result of the comparison.

SUMMARY OF THE INVENTION

It is accordingly an object of the invention to provide a system for contactless power and data transmission, which overcomes the hereinafore-mentioned disadvantages of the heretofore-known devices of this general type and in which tuning can be executed and realized in the simplest possible manner.

With the foregoing and other objects in view there is provided, in accordance with the invention, a system for contactless power and data transmission between a first mobile station and a second station, one of the stations comprising a tunable resonant circuit supplying a signal to be picked off; an integrable control circuit for driving the resonant circuit, the control circuit having a multiplicity of capacitors and a switching device for connecting the capacitors in parallel with the resonant circuit; and a device for receiving the signal to be picked off from the resonant circuit and for driving the switching device to tune the resonant circuit in dependence on a relative evaluation between at least two time-staggered signal levels of the signal to be picked off from the resonant circuit.

In accordance with another feature of the invention, the device for receiving the signal to be picked off from the resonant circuit and for driving the switching device has a comparison device for comparing the at least two time-staggered signal levels of the signal to be picked off from the resonant circuit with one another and supplying an output signal, and a control device for receiving the output signal of the comparison device to drive the switching device in dependence on the output signal.

In accordance with a concomitant feature of the invention, there is provided a sample-and-hold element receiving the signal to be picked off from the resonant circuit, the control device being an up/down counter to be clocked by the signal to be picked off from the resonant circuit, the up/down counter having an up/down control input to be controlled by the output signal of the comparison device, the comparison device being a comparator having a first input to be controlled by the signal to be picked off from the resonant circuit and a second input to be controlled by the signal to be picked off from the resonant circuit and fed through the sample-and-hold element.

The secondary circuit can be tuned in a simple manner to maximum signal and power transmission as a result of the provision of capacitors which can be switched into the secondary circuit. The tuning can be carried out automatically through the use of a regulating circuit contained in the mobile part. This can be carried out, for example, upon each start-up of the system, during the initialization phase. As a result, the tuning also takes account of the instantaneous ambient conditions due to which any interference influences can act on the coupling between the primary and secondary resonant circuits. Moreover, the aging of the components is automatically compensated for. The tuning can also be executed in the event of momentary changes such as, for example, actuation of a smart card, initialization of the transmission or the like. The components to be used can easily be realized in an integrated control circuit, with the result that the outlay for circuitry and the costs are relatively low.

Other features which are considered as characteristic for the invention are set forth in the appended claims.

Although the invention is illustrated and described herein as embodied in a system for contactless power and data transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
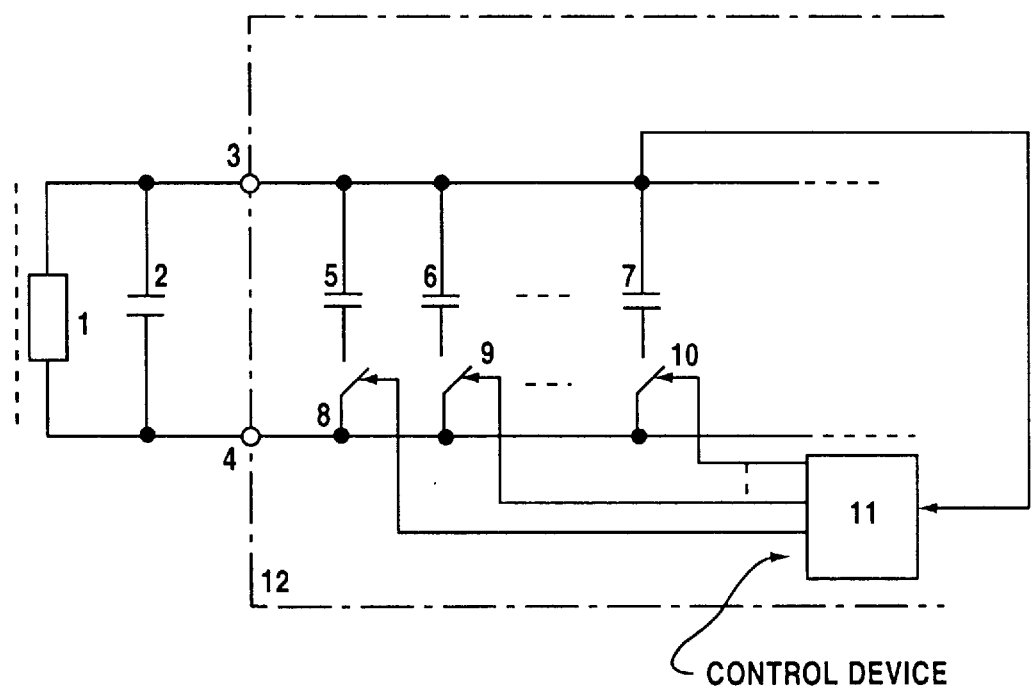
FIG. 1 is a basic schematic and block circuit diagram of a mobile part of a system according to the invention.

Referring now to the figures of the drawings in detail and first, particularly, to FIG. 1 thereof, there is seen a mobile part which has a parallel resonant circuit formed by an inductor 1 and a capacitor 2. An integrated control device 12 is connected to terminals 3, 4 of the resonant circuit 1, 2. A voltage which can be picked up at the terminals 3, 4 is rectified, smoothed and possibly regulated in the integrated circuit 12, with the result that a DC voltage which is then available is used for the supply of the integrated circuit 12. The resonant circuit 1, 2 is inductively coupled to a non-illustrated stationary resonant circuit.

Capacitors 5, 6, 7 can be connected in parallel with the resonant circuit 1, 2 through the use of respective switching elements 8, 9 and 10. The switching elements can be constructed as transistors. The switching elements 8–10 are driven by a control device 11. The device 11 ensures that a resonant frequency of the resonant circuit 1, 2 is changed by switching in one or more of the capacitors 5–7 in such a way that the best possible tuning to a primary circuit, which is coupled in at the coil 1, is achieved. For this purpose, the voltage which can be picked off at the resonant circuit (terminal 3) is coupled into the control device 11, with the result that correction is carried out in such a way that a maximum received voltage level is achieved.

The resonant frequency of the resonant circuit is preferably set in such a way that coarse tuning is present. This can be achieved by using components of appropriate quality or by already carrying out pretuning, in a test device, by connecting one or more of the capacitors 5–7 in parallel, and permanently storing a switch setting, for example in a nonvolatile memory in the control device 12. It is then possible to carry out automatic fine tuning upon each system start-up with the regulation shown in FIG. 1. In this case, the instantaneous operating conditions, such as external interference influences and the aging state of the components, for example, are also taken into account automatically.

Figure 2:
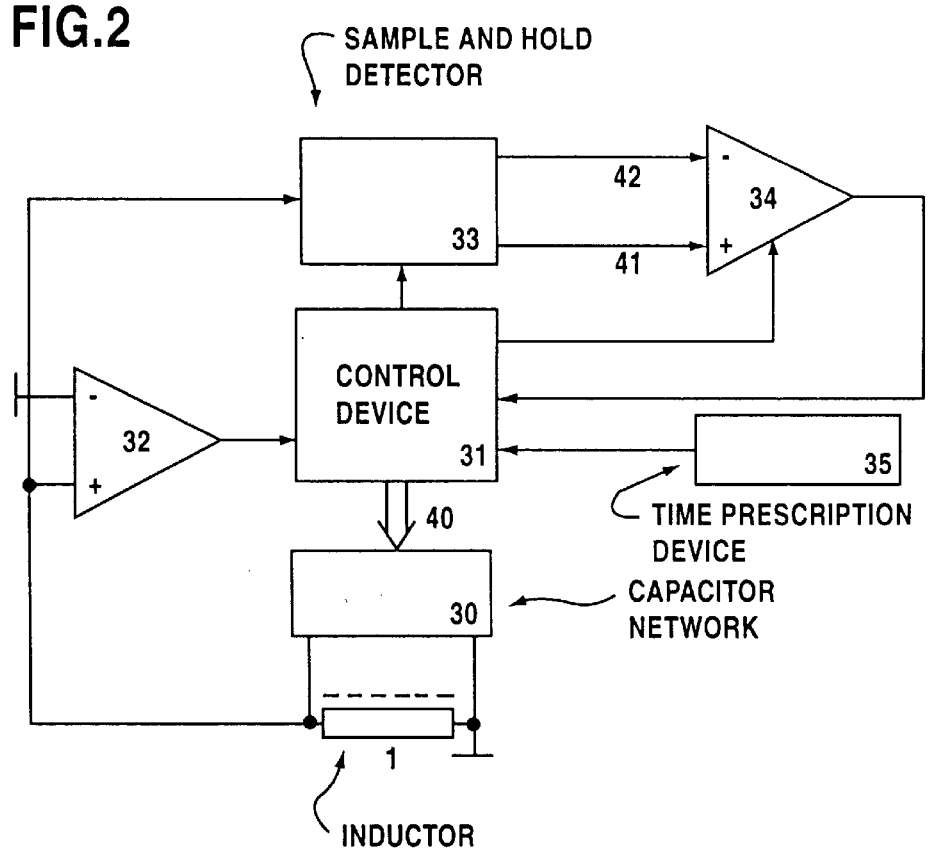
FIG. 2 is a basic schematic and block circuit diagram of a control circuit of the mobile part.
Figure 3:
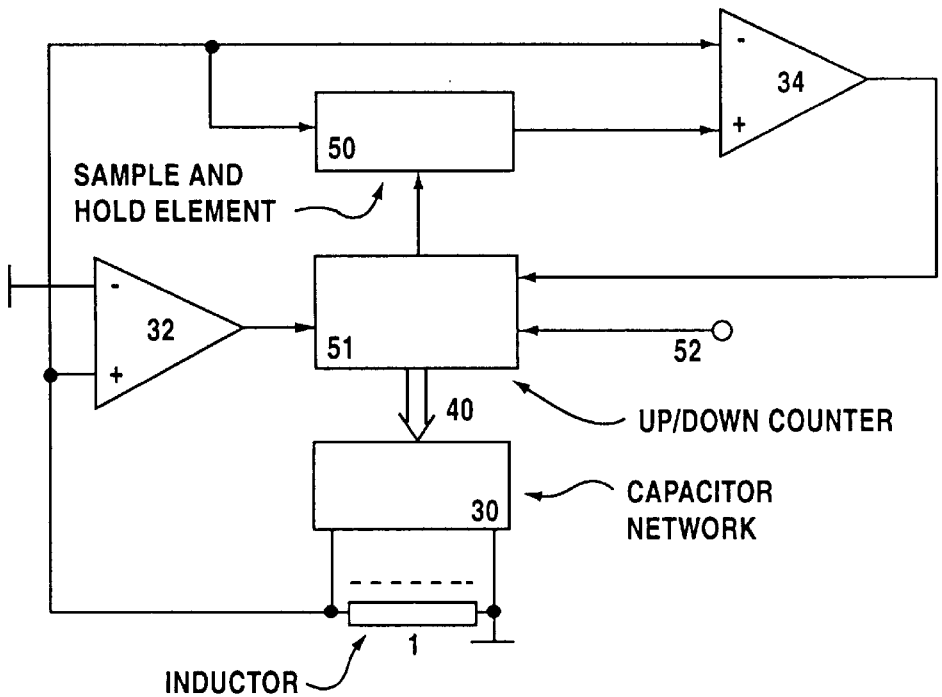
FIG. 3 is a schematic and block diagram of a circuitry embodiment of the basic circuit of FIG. 2.

A basic realization of the control device 11 is shown in FIG. 2. In a simplified illustration, a capacitor network 30 having capacitors which can be connected through a number of control lines 40, is shown in parallel with the inductor of the resonant circuit 1 of the mobile part. The capacitors can each have different or identical capacitances. The control or data lines 40 are set by a control device 31 in such a way that the best possible tuning to the primary circuit is present. For this purpose, the circuit has a device 33 which implements a function of a differential sample-and-hold detector. The voltage which can be picked off at the resonant circuit 1 is fed to an input side of the device 33. The device 33 has an output side at which an output signal corresponding to the instantaneous value of the resonant circuit voltage is generated at a terminal 41 and a voltage signal which is staggered in time with respect to the output signal is generated at a terminal 42. The outputs 41, 42 are connected to inputs of a comparator 34. The latter establishes whether the instantaneous value of the resonant circuit voltage is higher or lower than the voltage value which is earlier in time. A corresponding output signal of the comparator 34 is fed into the control device 31. The control device 31 controls a sampling instant of the comparator 34 and a sampling instant of the device 33. The device 31 can be controlled by an algorithm, which is afforded by a software-supported realization through the use of a microprocessor. A realization through the use of a counter is also possible, as is shown in FIG. 3. These realization options for the device 31 and the counter presuppose a clocked method of operation. This clock signal is derived from the resonant circuit voltage through the use of a comparator 32, for example, and is fed into the device 31. Furthermore, a device 35 is provided which communicates a time prescription to the control device 31. If, for example, a time duration determined by the device 35 is exceeded, the control operation is switched off. If operating conditions exist which do not enable exact tuning, or if defective functional units are present, then the tuning operation is ended after the prescribed time has elapsed, with the result that the system is operationally available. This also prevents a tuning operation from being initiated in the event of changes in the coupling during normal operation, for example during a data transmission. This could otherwise lead to a transmission error.

A circuitry realization of the basic circuit shown in FIG. 2 is indicated in FIG. 3. Identical elements in this case are provided with identical reference symbols. An up/down counter 51 which is provided in this case as the control element has outputs 40 which form the control lines for driving the capacitor network 30. If the control lines 40 are connected to the binary outputs of the counter 51, the capacitors, which are contained in the network 30 and can be connected in parallel with the resonant circuit, are expediently gradated in a binary manner with regard to their capacitances. The output of the comparator 34 is connected to an up/down counting input of the counter 51. An enable signal can be fed in at an input 52 of the counter 51. The comparator 32 is connected to a clock input of the counter 51.

In the concrete exemplary embodiment of FIG. 3, a noninverting input of the comparator 34 is connected to a sample-and-hold element SO, at which the voltage signal of the resonant circuit is fed in on the input side. The resonant circuit voltage is connected directly to an inverting input of the comparator 34. A peak value produced by the sample-and-hold element 50 is then compared in the comparator 34 with the instantaneous resonant circuit voltage. At the beginning of the tuning operation, it will be established, for example, that due to the greater detuning existing at its sampling instant, the value fed by the sample-and-hold element 50 is lower than the instantaneous value. The output of the comparator then carries a logical "0", which causes the counter 51 to count up, for example. As a result, the capacitor network 30 is changed through the control line 40 in such a way that the capacitance which can be connected to the coil 1 is increased. If the tuning maximum is exceeded, the voltage level that is present at the noninverting input of the comparator 34 is higher than that present at the inverting input. The output of the comparator 34 then switches to logical "1", with the result that the counter counts down, for example. The counting direction is changed each time the output signal of the comparator changes. Consequently, the capacitor network 30 is set to the best possible coupling. The tuning operation can then be suspended through the terminal 52.

As an alternative to the embodiment described above, the relative evaluation of the at least two staggered-in-time signal levels of the signal which can be picked off from the resonant circuit can also be implemented by alternately connecting an additional capacitor to the resonant circuit and disconnecting it again during the tuning operation. As a result, the resonant circuit emits signals with different voltage amplitudes, which can be evaluated relative to one another. It is possible to draw an unambiguous conclusion about the necessary measure for improving the tuning by comparing the two signal values in the two circuit states of the additional capacitor. If the signal when the additional capacitor is switched in is higher than when the capacitor is switched out, a further tuning capacitor must be switched in order to improve the tuning, and vice versa. Repeating this procedure leads to that tuning state finally being reached in which both evaluation states (with and without a connected additional capacitor) essentially yield the same output signal at the resonant circuit. A further improvement of the tuning is then achieved by connecting a tuning capacitor having half the capacitance of the additional capacitor to the resonant circuit. This procedure is particularly suitable when a modulation capacitor is present in any case and through the use thereof digital signal values, after having been modulated onto a carrier, are transmitted to the stationary station. The modulation capacitor is then preferably used as the additional capacitor described above.

I claim:

1. In a system for contactless power and data transmission between a mobile station and another station, the mobile station comprising:

a tunable resonant circuit supplying a signal to be picked off;

an integrable control circuit for driving said resonant circuit, said control circuit having a multiplicity of capacitors and a switching device for connecting said capacitors in parallel with said resonant circuit;

a drive device including a comparison device comparing two time-staggered signal levels of the signal to be picked off from said resonant circuit at two different points in time with one another and generating a comparison output signal, and a control device receiving the comparison output signal and tuning said tunable resonant circuit by driving said switching device in dependence on the comparison output signal.

2. The system according to claim 1, including a sample-and-hold element receiving the signal to be picked off from said resonant circuit, said control device being an up/down counter to be clocked by the signal to be picked off from said resonant circuit, said up/down counter having an up/down control input to be controlled by the comparison output signal of said comparison device, said comparison device being a comparator having a first input to be controlled by the signal to be picked off from said resonant circuit and a second input to be controlled by the signal to be picked off from said resonant circuit and fed through said sample-and-hold element.

3. In a system for contactless power and data transmission between a mobile station and another station, a mobile station, comprising:

a tunable resonant circuit supplying a signal to be picked off;

an integrable control circuit for driving said resonant circuit, said control circuit having a multiplicity of capacitors and a switching device for connecting said capacitors in parallel with said resonant circuit; and a device for receiving the signal to be picked off from said resonant circuit and for driving said switching device to tune said resonant circuit in dependence on a relative evaluation between at least two time-staggered signal levels of the signal to be picked off from said resonant circuit, including a sample-and-hold element receiving the signal to be picked off from said resonant circuit, a comparison device for comparing the at least two time-staggered signal levels of the signal to be picked off from said resonant circuit with one another and supplying an output signal, said comparison device being a comparator having a first input to be controlled by the signal to be picked off from said resonant circuit and a second input to be controlled by the signal to be picked off from said resonant circuit and fed through said sample-and-hold element, and a control device receiving the output signal of said comparison device to drive said switching device in dependence on the output signal, said control device being an up/down counter clocked by the signal to be picked off from said resonant circuit, said up/down counter having an up/down control input controlled by the output signal of said comparison device.

* * * * *